United States Patent [19]

Moran et al.

[11] Patent Number: 4,466,039

[45] Date of Patent: Aug. 14, 1984

[54] OPEN CIRCUIT CURRENT TRANSFORMER PROTECTION CIRCUIT

[75] Inventors: Richard J. Moran; Norbert J. Reis, both of Milwaukee, Wis.

[73] Assignee: McGraw-Edison Company, Rolling Meadows, Ill.

[21] Appl. No.: 402,914

[22] Filed: Jul. 29, 1982

[51] Int. Cl.$^3$ .............................................. H02H 7/04
[52] U.S. Cl. ...................................... 361/35; 361/54; 361/91
[58] Field of Search ...................... 361/35, 54, 55, 56, 361/91, 110, 111, 112, 127; 307/540, 544, 549, 307/560; 315/91, 92, 256

[56] References Cited

U.S. PATENT DOCUMENTS

| | | |
|---|---|---|
| 3,031,600 | 4/1962 | Euterneck . |
| 3,571,660 | 3/1971 | Phillips ............................ 361/111 X |
| 3,573,550 | 4/1971 | Baker, Jr. ............................ 361/56 |
| 3,723,812 | 3/1973 | Lynch .................................... 361/35 |
| 3,727,104 | 4/1973 | Neal et al. ............................. 361/35 |
| 3,878,434 | 4/1975 | Voorhoeve . |
| 3,947,751 | 3/1976 | Bray . |
| 4,075,510 | 2/1978 | Pascente .......................... 361/56 X |
| 4,339,695 | 7/1982 | Siglock ............................. 361/35 X |

OTHER PUBLICATIONS

Transient Voltage Suppression Manual-GE, Copyright 1976, p. 49.
Sketch in a Note to J. Moran Dated 8/31/81.
Beckwith Electric Co., Inc. CT Secondary Protector-2 pages.

Primary Examiner—Harry E. Moose, Jr.
Attorney, Agent, or Firm—Eugene R. Sawall; Jon Carl Gealow; Hugh M. Gilroy

[57] ABSTRACT

A three-phase power supply has a current transformer in each power line. The transformer secondary winding is connected to a load. Generally, the load is a control means responsive to the current being sensed. A triac in parallel with the secondary winding and load has its gate connected by a voltage sensitive circuit to sense the corresponding secondary winding voltage and to conduct and protect the transformer in the event of load loss. The gate circuit includes a metal oxide varistor and a linear resistor in series connected in parallel with the secondary winding. A second linear resistor is connected to the common node of the first linear resistor and metal oxide varistor. The second linear resistor is in series with a diac and connects the gate to the common node of the varistor and first resistor. A trigger capacitor is connected between the common node of the second resistor and diac and the opposite end of the first linear resistor. On load loss, the secondary voltage rises and the varistor conducts, rapidly charging the trigger capacitor. The diac then conducts and the trigger capacitor supplies a large but controlled gate current to drive the triac "on." During the opposite half cycle, this cycle repeats until a load draws enough current to keep the secondary voltage within a critical level.

13 Claims, 1 Drawing Figure

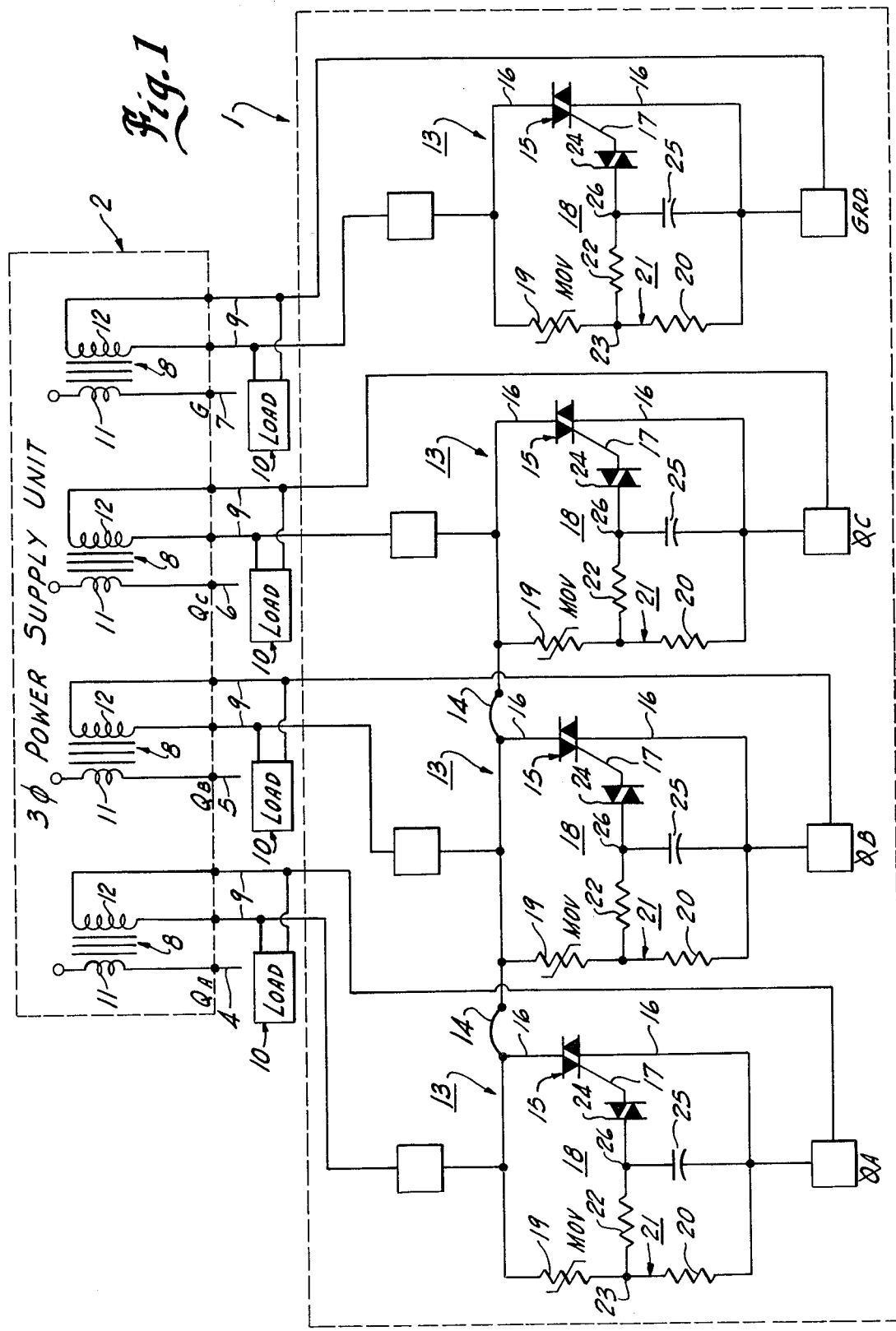

OPEN CIRCUIT CURRENT TRANSFORMER PROTECTION CIRCUIT

BACKGROUND OF THE PRESENT INVENTION

This invention relates to an open circuit current transformer protection circuit for power supply systems and particularly to a triggered circuit connected across the secondary of a power line current transformer and responsive to transformer load loss or malfunction to short circuit and protect the current transformer.

In three-phase power supplies and the like, a current transformer is generally coupled to each alternating current line to provide an isolated output to an instrumentation or controls. The primary winding of the current transformer is connected in series with a phase line while the secondary winding is magnetically coupled to the primary winding by a suitable magnetic core. The secondary winding provides output power to a meter, a control or the like. It is well known that if the current transformer loses its load, the voltage in the secondary winding rises rapidly, being limited only by the saturation characteristic of the core. In the absence of any other limiting means, the voltage will rise above the maximum rated voltage of the current transformer insulation, the connectors and the like, with significant damage to the transformer. Further, the high voltage creates a relatively hazardous condition to personnel who may be working with the transformer. A voltage below that which will cause damage or hazard is typically selected as a critical level and protective means are often used to insure operation at or below the critical level.

Various protective circuits have been suggested. For example, U.S. Pat. No. 3,723,812 assigned to the same assignee as this invention, discloses a pair of voltage level responsive semi-conductor switch means, such as zener diodes connected back-to-back, to establish protection during each half cycle of the alternating current output of the current transformer. In the event of a load loss, the increasing abnormal voltage reaches the zener breakover voltage and the one zener diode conducts to establish a short circuit directly across the secondary winding preventing the voltage from rising to damaging and dangerous voltage levels. The impedance of the winding limits the current flow. Other systems have also been suggested, which use a bidirectional conducting thyristor, generically referred to as a triac. For example, the present assignee of this invention has built and made available short circuit protection on one half cycle using a triac connected in parallel with the secondary winding. A diac, which is a bidirectional breakdown diode, in series with a resistor connected to the gate provided a voltage sensitive circuit for triggering the triac when the voltage rose above a selected dangerous level. U.S. Pat. Nos. 4,075,510 and 3,727,104 disclose other triac circuits for producing shorting circuits for protecting a load or a switching device. U.S. Pat. No. 4,075,510 discloses an A.C. supply system including either a single triac or a pair of back-to-back triacs connected in series with a load. A switching circuit is connected to the gate or gates and selectively triggers the triacs to control the power level applied to the load. A metal oxide varistor may be connected to directly sense the voltage across the triacs, which connection may include connection to the gates or may be between the main triac electrodes. The triac(s) have a finite off-state breakdown voltage rating and the varistor serves as a simple voltage responsive device connected in parallel with the triac to ensure that transient voltages above the breakdown voltage do not occur. In this triac protective system, the varistor carries full current and repeated operation will significantly effect the life of the unit. Further, because of the characteristic of a varistor, a heavy current discharge must be carried by the varistor. The heavy current discharge will adversely effect the life of the varistor, particularly with repeated, continuous halfcycle triggering as in the case of load loss of a current transformer in contrast to an occasional transient fault. U.S. Pat. No. 3,727,104 discloses a constant current regulator having a triac connected in parallel with the regulator and the lamp to protect the source if the lamp load is lost. A gate circuit consisting of a capacitor in series with a resistor is connected in parallel with the Triac, with the common center node connected directly to the gate. A conventional capacitor coupling tends to make the gate circuit susceptible to other fast transient voltages which might interfere with proper control.

Thus, in monitoring and protective systems for power supplies and the like, the protective circuit must provide a reliable system capable of repeated carrying of high voltage and high current while maintaining temperature stability and having a long operating life. Although various prior art systems have been suggested, there is a need for a temperature stable and long life protective circuit.

SUMMARY OF THE PRESENT INVENTION

The present invention is particularly directed to an open circuit current transformer protective circuit including a bilateral gated switch means, such as a triac or similar functioning device, and having a special gate coupling circuit incorporating a varistor in combination with current control means so as to establish a minimum varistor current prior to triggering in combination with a current limit means which limits the current flow through the varistor at and after triggering. The minimum trigger current level creates and maintains a temperature stable triggering voltage while the current limit means prevents voltage degradation of the metal oxide varistor and produces a long varistor operating life. The circuit of this invention thus may maintain a highly stable voltage responsive triggering system and increase the life of the varistor by a factor as great as 10,000.

More particularly in a preferred optimum construction of the present invention, the current transformer is coupled to the power supply line in accordance with conventional practice and a load is connected across the secondary winding. A triac is connected in parallel with the secondary winding and thus also with the load. A gate circuit includes a metal oxide varistor connected in a sensing branch circuit with a first linear resistor, and the sensing branch circuit is connected in parallel with the triac, with the secondary winding and with the load. A second linear resistor is connected to the common node of the first linear resistor and metal oxide varistor. The second linear resistor is connected in series with a voltage sensitive device, such as a diac, which is connected to the gate of the triac. A trigger capacitor is connected between the common node of the resistor and diac and the opposite end of the first linear resistor. The metal oxide varistor acts as an effective open circuit and essentially avoids any significant current flow until the secondary voltage rises to a critical level. A rise in secondary voltage is often caused by total load loss but can be caused by a partial malfunction of the load circuit. If the secondary voltage rises above the critical level, the varistor begins to conduct. The first linear resistor is of relatively high resistance and particularly insures that the metal oxide varistor is carrying a minimum current. The minimum current is sufficient to cause the varistor to conduct in a stable region of its operation. Also, the minimum current must be sufficient to increase the voltage on the trigger capacitor enough to cause the diac to conduct. With the minimum current flow, a rapid charging of the trigger capacitor to the trigger level of the diac is established. The diac then conducts and drives the triac into full conduction for the balance of the alternating current half cycle. The conducting triac establishes a protective short circuit across the transformer secondary winding for that half cycle. During the opposite half cycle, the cycle just described repeats as long as the secondary voltage exceeds the critical level.

As noted, the first linear resistor ensures a minimum current to charge the trigger capacitor to the triggering voltage. The minimum current requirement is important in order to obtain a breakover or conducting voltage of the metal oxide varistor which is temperature stable. The second linear resistor, which carries the discharge current when the diac conducts, limits and significantly reduces the current through the metal oxide varistor. For example, in a practical application, the current was reduced by a factor of ten, which increased the life of the varistor by a factor of thousands.

The present invention thus provides a reliable protective operation for a current transformer or the like having the ability to respond to repeated high voltage and high current condition requirements with a temperature stable triggering and a long operating life.

DESCRIPTION OF THE DRAWING FIGURES

The drawing furnished herewith shows a preferred embodiment of the invention applied to a three-phase power supply system with ground.

DESCRIPTION OF THE PREFERRED EMBODIMENT

Referring to the drawing, a current transformer protector assembly 1 is shown applied to a three-phase, four-wire power supply 2 having three-phase lines 4, 5 and 6 and a ground line 7. Each phase and ground line 4–7 includes a similar current transformer 8 which senses the current in the corresponding line. The output leads 9 of the transformers are each connected to a load, such as a meter or control circuit. The current transformer 8 includes a primary winding 11 connected in series with the supply line and a secondary winding 12 of a substantially greater number of turns. The output leads 9 of a secondary winding provide the current signal to a load 10.

The current transformer insulation, the connector plugs or the like will be damaged if the open circuit voltage of the current transformer 8 is not limited. An open circuit current transformer protector unit 13 is connected to the leads 9 of each of the current transformers 8. Each protection unit 13 is similarly constructed and connected to one of the current transformer 8 of one of the power lines 4–7. In actual practice, the several circuits or units 13 may be mounted to a common circuit board with appropriate labels for interconnection to the current transformer output leads 9. The several circuits 13 are shown with one side of the current transformer input lead connections tied in common by a pair of permanent jumper wires 14. In a system where the phase protectors should not be connected in common, the jumper wires 14 can be readily removed as by cutting or the like.

The illustrated four-wire supply includes ground line protection. Where a ground line is not used, the ground circuit or protector unit 13 can of course be eliminated.

Each protector unit 13 senses an incipient damaging high voltage condition on the connected output leads 9. Each protector unit 13 further includes a triac 15 which is gated "on" in response to such an abnormal voltage and thereby short circuits the current transformer secondary for a half cycle, which of course limits the voltage generated within and across the secondary.

The protector units 13 allow the user to remove loads 10, usually electronic controls, from the switchgear of the 3$\phi$ power supply unit 2 while the line is hot and without damage to the current transformers. At some subsequent time an appropriately repaired or a new instrument or control load 10 can be added to the switch gear, again while the line is hot. Reconnection of an appropriate new load 10 provides instantaneous reset of the protector unit 13 with a load controlled limiting of the output voltage below the critical voltage.

The ground circuit current transformer protector unit 13 is described in detail as exemplary of protector units 13 connected to current transformers 8 associated with the three phase lines.

Referring particularly to the ground protector circuit, the triac 15 is connected with its main power terminals 16 connected directly to secondary transformer leads 9.

The triac 15 includes a gate 17 to turn the triac "on" during either half cycle of the alternate current voltage on leads 9, in accordance with known practice.

When the triac 15 is turned fully on, the conductivity of the triac is substantial and essentially creates a short-circuit across the secondary winding 12 of the current transformer 8. The short circuit path limits the voltage rise in the transformer 8 to a level significantly below the voltage rating of the current transformer insulation, the plug connector and the like.

In the present invention the gate 17 is connected to sense the voltage across the output of the secondary of the current transformer by a special gate coupling circuit 18. In the illustrated embodiment of the coupling circuit, a metal oxide varistor 19 is connected in series with a first linear resistor 20 in a sensing branch circuit 21 which is directly connected to the output leads 9 of the secondary winding of the current transformer 8. A second linear resistor 22 is connected to a sensing common node 23 of the metal oxide varistor 19 and the first linear resistor 20, and in series with a voltage sensitive diac 24 which is also connected to the gate 17. A trigger capacitor 25 is connected to a triggering common node 26 of the second resistor 22 and the diac 24 and to the opposite side of the first linear resistor 20. The voltage across the capacitor 25 rises in accordance with the voltage drop across the first linear resistor 20 once metal oxide varistor 19 conducts.

With the voltage below a selected safe level for the current transformer 8, the metal oxide varistor 19 operates in a high resistance mode and effectively presents an open circuit condition. Prior to a rise in voltage, the leakage current is insignificant since the voltage drop across first resistor 20 is substantially below the trigger level of the diac 24, even if resistor 20 should have a high resistance. When the voltage rises above a critical level, the resistance value of the metal oxide varistor 19 changes essentially instantaneously and initiates significant current flow. This current flow creates a voltage across the resistor 20 and thus in capacitor 25 greater than the breakdown voltage of the disc 24.

When the secondary winding 12 voltage is greater than the critical voltage, the metal oxide varistor 19 conducts sufficiently to charge trigger capacitor 20 to the necessary level to trigger the diac 24 to conduction. To ensure against variable triggering of the triac 15 and to enhance temperature stable operation of protective unit 13, it is now desirable to have the metal oxide varistor 19 conduct one milliampere of current to initiate triggering of triac 15. Resistor 20 functions as a current control means to insure varistor 19 is in a stable region before triggering occurs. For example, in a practical application, the diac 24 may require a trigger voltage of 27 volts and the system design may specify a minimum capacitor voltage of 32 volts The resistor 20 is thus selected in accordance with the voltage to be developed across the capacitor. For example, if a trigger voltage of 32 volts is desired, the resistor for a one milliamp current will be selected as has been used.

Once the diac 24 fires, current is supplied directly to gate 17 of the triac 15, to cause full conduction of triac 15. As is well known, the triac 15 then functions as a short circuit across the secondary winding 12 for the balance of the half cycle. At the end of the half cycle, the polarity of the output of the transformer reverses, and the triac 15 turns off. The system responds during the next half cycle in precisely the same manner when the critical voltage is exceeded.

The half cycle protection is thus not polarity dependent, but occurs only when desired and necessary.

The first linear resistor 20 is selected to ensure that the metal oxide varistor is conducting at least 1 ma. of current in response to the secondary winding 12 voltage reaching the critical voltage of metal oxide varistor 19. The secondary winding voltage required to trigger the triac 15 is equal to the minimum varistor breakover or trigger voltage, in combination with the first linear resistor and the breakdown voltage of the diac. With the varistor 19 operating at one milliamp the voltage across the varistor is essentially independent of temperature and provides a very temperature stable voltage signal. For example, in a practical circuit the varistor voltage at one ma. is 223 volts minimum and 282 volts maximum at 25 degrees centigrade (°C.). The temperature coefficient is equal to a 0.05%/°C. The minimum varistor voltage of 223 volts when added to the breakdown voltage of the diac reacts to any abnormal voltage above 250 volts across secondary winding 12.

The metal oxide varistor 19 appears as a variable resistance in parallel with a capacitor, and when the diac 24 and triac 15 turn on, a surge of current through gate 17 is created, driving the triac fully on and latching the triac in the full conducting state. Although the rapid drive of the triac 15 into a fully conducting state is desirable, the inventor has found that the turn on surge current adversely effects the life of the varistor, and further that by significantly limiting such turn on surge current the operating life of the varistor increases by a substantial factor. A typical nonlimited varistor would supply a 3 ampere current surge. Second linear resistor 22, which limits the turn on surge current to approximately 0.3 ampere, will increase the operational life of the metal oxide varistor by a factor of up to 10,000 times. Second linear resistor 22 functions as current limit means to limit turn on surge current.

Generally there is a ten microsecond time constant for charging of the trigger capacitor via the relatively low valued current limit resistor 22 to the trigger level of the diac.

Triacs having the necessary rating to carrying the short circuit current are readily available. Typically, a protective circuit for a three-phase power supply system would use a triac rated for 2 amps of current transformer output continuously, and 20 amps current transformer output for up to three seconds. The rating characteristics can be appropriately increased by selection of an appropriate triac. For example, a 40 amp triac is available with a heat sink which would permit a continuous 10 amp transformer output, a 100 amp surge for up to two seconds and a 600 amp surge for up to one millisecond.

In practice, the current transformer protection units 13 are designed to reset to secondary winding 12 a voltage of 310 volts plus or minus 60 volts. When gated, the triac shorts the current transformer leads for one half cycle.

Various circuit configurations for carrying out the invention are contemplated as being within the scope of the following claims, which particularly point out and distinctly claim the subject matter which is regarded as the invention:

I claim:

1. A protection circuit for a current transformer having a primary winding connected in series with a current to be measured and a secondary winding having output leads adapted to be connected to a load comprising:
    a bilateral gated switch connected in parallel with said secondary winding to provide a flow path for substantially all current flowing through said secondary winding other than through said load, a gate coupling circuit connected across said secondary winding and connected to a gate of said bilateral gated switch, said gate coupling circuit including a varistor and a varistor current control means to establish a minimum varistor current prior to triggering of said bilateral gated switch, said minimum varistor current sufficient to establish a temperature stable voltage across said varistor and a current limiting means to limit the current flow through the varistor at and after triggering said bilateral gated switch.

2. A protection circuit for a current transformer having a primary winding connected in series with a current to be measured and a secondary winding having output leads adapted to be connected to a load comprising: a bilateral gated switch connected in parallel with said secondary winding to provide a flow path for substantially all current flowing through said secondary winding other than through said load, a gate coupling circuit connected across said secondary winding and connected to a gate of said bilateral gated switch, said gate coupling circuit including a varistor and a varistor current control means to establish a minimum varistor current prior to triggering of said bilateral gated switch, said varistor current control means includes a sensing branch circuit, said sensing branch circuit being connected in parallel with said secondary winding and comprising a first resistor essentially in series with said varistor, and said gate coupling circuit includes a trigger capacitor connected across said first resistor whereby the voltage across said trigger capacitor is controlled by said varistor current and the resistance of said first resistor, and a voltage sensitive switch connected between said trigger capacitor and said gate, said minimum varistor current sufficient to establish a temperature stable voltage across said varistor and a current limiting means to limit the current flow through the varistor at and after triggering said bilateral gated switch, whereby said bilateral gated switch is turned on in response to a voltage appearing across said secondary winding in excess of a critical level.

3. The protection circuit of claim 1 wherein said current limiting means is a second resistor connected between said varistor and said gate, said second resistor is selected to substantially reduce the current flow through said varistor when said bilateral gated switch conducts.

4. The protection current of claim 1 wherein said bilateral gated switch is a triac connected in parallel with said secondary winding and said current control means includes a first linear resistor connected in series with said varistor in a sensing branch circuit, said sensing branch circuit being connected in parallel with the secondary winding, a second linear resistor connected to a sensing common node of said first linear resistor and said varistor, a voltage sensitive device connected between said second linear resistor and said gate, and a trigger capacitor connected between a trigger common node of said second linear resistor and said voltage sensitive switch, and the opposite end of said first linear resistor, said first linear resistor being of relatively high resistance requiring said minimum varistor current through said varistor of at least one milliampere to charge the trigger capacitor to the breakdown level of said voltage sensitive device.

5. The protection current of claim 4 wherein said voltage sensitive device is a diac and said varistor is a metal oxide varistor.

6. The protective circuit of claim 4 wherein said second linear resistor has a substantially smaller resistance than said first linear resistor.

7. The protective circuit of claim 3 wherein said second linear resistor reduces the current by a factor of ten.

8. In combination with a current transformer having an energized primary winding and a secondary winding having output leads adapted to be connected to a load, said secondary winding being disconnectable from said load, a bilateral gated switch connected across said secondary winding to provide a principal flow path for current flowing through said secondary winding other than through said load, said bilateral gated switch means connected essentially in series with the secondary winding when the latter is disconnected from the load and being nonconductive while said load is connected to the secondary winding, said bilateral gated switch having gate responsive to a turn-on voltage and current to drive said bilateral gated switch into full conduction for essentially establishing a short circuit across said secondary winding, a gate coupling circuit connecting said gate to said secondary winding which comprises a resistor means, a varistor connected essentially in series with said resistor means in a sensing branch, said sensing branch being connected in parallel across said secondary winding, a trigger capacitor, a second resistor connected between a sensing common node between said first resistor and said varistor and connected essentially in series with said trigger capacitor, said trigger capacitor also being connected to the opposite side of said first resistor, whereby said first resistor controls the voltage developed across said trigger capacitor for any given varistor current, a voltage sensitive switch connected essentially in series with said second resistor directly to the gate, whereby said bilateral switch is turned on in response to a voltage appearing across said secondary winding in excess of a critical level, said first resistor also establishing a minimum current through said varistor to charge said trigger capacitor to the breakover voltage of said voltage sensitive switch and thereby maintain temperature stable response of said varistor, said second resistor being selected to substantially reduce the current flow through the varistor in response to conduction of said voltage responsive switch.

9. The system of claim 8 wherein said bilateral gated switch means is a triac and said voltage sensitive device is a diac.

10. The system of claim 8 or 9 wherein said first and second resistors are linear resistors.

11. A power supply system comprising in combination, a current transformer having an energized primary winding and a secondary winding having output leads adapted to be connected to a load, said secondary winding being disconnectable from said load, a bilateral gated switch connected across said secondary winding to provide a flow path for substantially all current flowing through the secondary winding other than through said load, said bilateral gated switch connected in series with said secondary winding when the latter is disconnected from the load and being nonconductive while said load is connected to the secondary winding, said bilateral gated switch having an input gate responsive to a turn-on voltage and current to drive said bilateral gated switch into full conduction for essentially establishing a short circuit connection across said secondary winding, a gate coupling circuit connecting said gate to said secondary winding and comprising a metal oxide varistor in combination with current control means to establish a minimum varistor current prior to triggering of a current level to establish a temperature stable voltage and with a current limiting means to limit the current flow through said varistor at and after triggering.

12. A power supply system comprising in combination, a current transformer having an energized primary winding and a secondary winding having output leads adapted to be connected to a load, said secondary winding being disconnectable from said load, a bilateral gated switch connected across said secondary winding to provide a flow pathe for essentially all current flowing through the secondary winding other than through said load, said bilateral gated switch connected in series with said secondary winding when the latter is disconnected from the load and being nonconductive while said load is connected to the secondary winding, said bilateral gated switch having an input gate responsive to a turn-on voltage and current to drive said bilateral gated switch into full conduction for essentially establishing a short circuit connection across said secondary winding, a gate coupling circuit connecting said gate to said secondary winding and comprising a metal oxide varistor in combination with current control means to establish a minimum varistor current prior to triggering of a current level to establish a temperature stable voltage and with a current limiting means to limit the current flow through said varistor at and after triggering, said current control means includes a first linear resistor connected essentially in series with said varistor in a sensing branch, said sensing branch being connected in parallel across said secondary winding, a second linear resistor connected to a sensing common node of said first linear resistor and varistor, a trigger capacitor connected essentially in series with said second linear resistor in parallel with said first linear resistor whereby the voltage across said trigger capacitor is controlled by the varistor current and the resistance of said first linear resistor, and a voltage sensitive switch connected between said trigger capacitor and said gate whereby said bilateral gated switch is turned on in response to a voltage appearing across said secondary winding in excess of a critical level, said second linear resistor limiting the peak current through said varistor when said bilateral gated switch conducts.

13. An alternating current power supply comprising, an alternating current source connectable to a load, a bilateral gated switch connected in parallel with said alternating current source to provide a flow path for substantially all current flowing from said alternating current source other than through said load, a gate coupling circuit connected across said alternating current source and connected to a gate of said bilateral gated switch, said gate coupling circuit including a varistor and a varistor current control means to establish a minimum varistor current prior to triggering of said bilateral gated switch, said varistor current control means includes a sensing branch circuit, said sensing branch circuit being connected in parallel with said alternating current source and comprising a first resistor essentially in series with said varistor, and said gate coupling circuit includes a trigger capacitor connected across said first resistor whereby the voltage across said trigger capacitor is controlled by said varistor current and the resistance of said first resistor, and a voltage sensitive switch connected between said trigger capacitor and said gate, said minimum varistor current sufficient to establish a temperature stable voltage across said varistor and a current limiting means to limit the current flow through the varistor at and after triggering said bilateral gated switch whereby said bilateral gated switch, is turned on in response to a voltage appearing across said secondary winding in excess of a critical level.

* * * * *